United States Patent [19]
Freitag et al.

[11] Patent Number: 5,358,912
[45] Date of Patent: Oct. 25, 1994

[54] BAS REINFORCED IN-SITU WITH SILICON NITRIDE

[75] Inventors: Douglas W. Freitag; Kerry K. Richardson, both of Arlington, Tex.

[73] Assignee: Loral Vought Systems Corporation, Grand Prairie, Tex.

[21] Appl. No.: 742,410

[22] Filed: Aug. 8, 1991

[51] Int. Cl.$^5$ .............................................. C04B 35/58
[52] U.S. Cl. ..................................... 501/97; 501/98; 501/904; 342/4
[58] Field of Search ................ 501/97, 98, 904; 342/4

[56] References Cited

U.S. PATENT DOCUMENTS

| | | | |
|---|---|---|---|
| 4,073,845 | 2/1978 | Buljan et al. | 264/65 |
| 4,141,739 | 2/1979 | Chyng et al. | 106/39.6 |
| 4,717,693 | 1/1988 | Wittmer | 501/97 |
| 4,725,567 | 2/1988 | Hillig | 501/98 X |
| 4,734,234 | 3/1988 | Sterzel | 264/66 |
| 4,738,902 | 4/1988 | Prewo et al. | 428/697 |
| 4,766,096 | 8/1988 | Layden et al. | 501/17 |
| 4,788,162 | 11/1988 | Hillig | 501/32 X |
| 4,800,182 | 1/1989 | Izaki et al. | 501/92 |
| 4,814,301 | 3/1989 | Steinmann et al. | 501/92 |
| 4,818,635 | 4/1989 | Ekstrom et al. | 501/98 X |
| 4,830,800 | 5/1989 | Thomas et al. | 264/65 |
| 4,845,061 | 7/1989 | Inoguchi et al. | 501/97 |
| 4,883,776 | 11/1989 | Pyzik et al. | 501/10 |
| 4,919,689 | 4/1990 | Pyzik et al. | 51/309 |
| 5,063,384 | 11/1991 | Novak et al. | 342/4 X |
| 5,103,239 | 4/1992 | Verzemnieks et al. | 343/872 |
| 5,120,682 | 6/1992 | Ukyo et al. | 501/96 |

OTHER PUBLICATIONS

H. Pickup and R. J. Brook, "Barium Oxide as a Sintering Aid for Silicon Nitride", *Proceedings of the Second International Symposium, Ceramic Materials and Components for Engines,* edited by W. Bunk and H. Hausner, Apr. 14–17, 1986, pp. 93–99.

H. Pickup and R. J. Brook, "Barium Oxide as a Sintering Aid for Silicon Nitride", *Engineering With Ceramics 2,* British Ceramic Proceedings, No. 39, pp. 69–76, Dec. 1987, published by The Institute of Ceramics, Shelton, Stoke-on-Trent, Staffs, United Kingdom.

N. P. Bansal, M. J. Hyatt, and C. H. Drummond III, "Crystallization and Properties of Sr–Ba Aluminosilicate Glass–Ceramic Matrices", NASA Technical Memorandum 103764, Prepared for the 15th Annual Conference on Composites and Advanced Ceramics sponsored by the American Ceramic Society, Cocoa Beach, Fla., Jan. 13–16, 1991.

I. G. Talmy and D. A. Haught, "Ceramics in the System $BaOAl_2O_32SiO_2$—$SrOAl_2O_32SiO_2$ as Candidates for Radomes", Technical Report, Contract N60921-8-9-R-0200, Naval Surface Warfare Center, 1989.

*Primary Examiner*—Peter A. Nelson
*Attorney, Agent, or Firm*—Richards, Medlock & Andrews

[57] ABSTRACT

A high temperature, high strength in-situ reinforced ceramic composite adapted for use in various applications including missile radomes in which microwave transparency is required in a high temperature environment. The material is manufactured by a pressureless sintering process, in which silicon nitride and barium aluminosilicate are blended together, isostatically pressed into a desired shape and thereafter sintered.

15 Claims, 2 Drawing Sheets

BAS REINFORCED IN-SITU WITH SILICON NITRIDE

TECHNICAL FIELD OF THE INVENTION

This invention relates to in-situ reinforced glass ceramics. In particular, it relates to a high temperature, high strength ceramic composite suitable for a multitude of aerospace and marine uses, such as radomes and aircraft leading edges.

BACKGROUND OF THE INVENTION

The development of low cost-high performance radomes and sensor windows for millimeter wave applications is critical to successful implementation of present and future tactical missile systems. These weapon systems are expected to be operational over a wide domain of altitudes, ranges, and velocities. Successful implementation of the systems is often limited by current radome and sensor window technology as a result of their inability to handle the thermal environment and/or loading environments. Currently, slip cast fused silica and select glass-ceramics (Pyroceram, Rayceram, Barium Aluminosilicate) are the only ceramic materials in use or being considered for high performance radome applications due to their low cost and good electrical and thermal performance. However, use of these materials is limited due to the ever-increasing thermal, mechanical, and environmental requirements of advanced radome materials.

Present approaches to advanced ceramic radome and sensor window technology include reinforced slip cast fused silica and silicon nitride ($Si_3N_4$) derivatives. Reinforced slip cast fused silica reportedly offers increased fracture toughness but at a cost to its electrical performance and ease of fabrication. Several different types of $Si_3N_4$ based materials are under investigation but are thus far either operationally limited or prohibitively expensive due to fabrication processes.

Furthermore, in general, previous ceramic composite materials employ conventional ceramic whisker/platelet reinforcement, as opposed to the present inventions in-situ reinforcement. Conventional whisker/platelet reinforcement of ceramic materials consists of first manufacturing the ceramic whiskers or platelets. These whiskers/platelets are next mixed with matrix forming powders. The mixed powders and whiskers/platelets are then formed into a desired shape and densified by sintering.

There are many disadvantages to conventional whisker/platelet reinforcement. For example, the whiskers/platelets may become contaminated prior to incorporation into the matrix with these contaminants seriously impacting the ultimate performance of the composite. Toxicity concerns relate to physically handling the whiskers prior to their incorporation into the matrix and the disposal of the remaining whiskers thereafter. Platelets do not pose a toxicity problem. Difficulties in uniformly mixing the whiskers/platelets with the matrix forming powders occur because the whiskers/platelets routinely form clumps if not properly mixed which form anomalies in the fabricated composite. Mechanically intensive methods are commonly used to mix the whiskers/platelets and matrix forming powders but cause damage to the whiskers/platelets. The concentration of whiskers/platelets which can be added to the matrix forming powders and pressureless sintered to high theoretical densities is limited to less than 15% by volume. Higher whisker/platelet concentrations have been added by conventional means but require pressure-assisted sintering (hot pressing or hot isostatic sintering) resulting in increased manufacturing complexity and cost. Even with pressure-assisted sintering, whisker/platelet concentrations have been limited to less than 40% by volume. At higher whisker/platelet concentrations, high densities have not been achieved. When preparing a composite from whiskers/platelets mixed with matrix forming powders, the composite must be formed into the desired shape before (hot isostatic pressing) or during sintering (hot pressing). The latter approach requires extensive machining to achieve the desired final dimensions. During the forming of powders containing whiskers/platelets, the whiskers/platelet are preferentially aligned in directions dependent upon the shape forming flow fields. For example, during hot pressing, where the applied pressure is uniaxial, the whiskers/platelets are aligned into planes perpendicular to the pressing direction. A more drastic example is injection molding, where the whiskers/platelets take on preferred orientations which cause shape distortion during subsequent sintering accompanied by nonuniform shrinkage. In contrast to conventional whisker/platelet reinforcement, wherein the silicon nitride whiskers are grown outside of the matrix and thereafter added to the matrix powders, the present invention provides for the silicon nitride elongated fiber-like grains to be grown internally from a melt. This is what is meant by in-situ reinforcement.

There are many advantages to in-situ reinforcement. For example, contamination and toxicity are not a problem because the silicon nitride elongated fiber-like grains are not physically handled. The silicon nitride elongated fiber-like grains are grown internally, not grown externally and thereafter added. Further, by growing the silicon nitride elongated fiber-like grains internally, the difficulty of uniformly mixing the fiber-like grains with the matrix powders is obviated. Likewise, growing the silicon nitride elongated fiber-like grains internally allows for a composite that is totally isotropic and randomly reinforced, thus avoiding shape distortions during sintering that result from adding the whiskers externally. When the composite is totally isotropic and randomly reinforced, the electrical performance of the composite is greatly enhanced and the design of load bearing structure is simplified. Also, the present invention, by employing a low cost pressureless sintering method, achieves high densities ($\geq 97\%$) at high silicon nitride concentrations (50-90 vol. %).

SUMMARY OF THE INVENTION

In accordance with the invention, the shortcomings of previous ceramic materials are overcome by an in-situ reinforced glass ceramic composite comprising between 50-90 vol. % silicon nitride, of which 30-100 vol. % are elongated fiber-like grains of $\beta$-phase silicon nitride and the remainder equiaxed $\alpha$-phase silicon nitride, and between about 10-50% of barium aluminosilicate.

The in-situ reinforced glass ceramic according to the invention can be manufactured by blending the silicon nitride reinforcement forming powders with the barium aluminosilicate forming powders thereby forming a mixture which is thereafter sintered, with or without pressure, at a temperature between 1750°–1900° C. in a nitrogen atmosphere. The present invention is in-situ reinforced because the elongated fiber-like grains of silicon nitride are grown internally from a melt, not grown externally and thereafter added to the matrix.

DETAILED DESCRIPTION

The present invention combines the excellent electrical properties of barium aluminosilicate (BAS) with the excellent mechanical properties of silicon nitride ($Si_3N_4$) in the form of an in-situ reinforced ceramic composite. This is done through the use of BAS forming additives combined with o-phase $Si_3N_4$ which, when processed, form a composite structure composed of BAS reinforced with in-situ grown elongated grains of $\beta$-phase $Si_3N_4$.

Low cost fabrication occurs through the use of pressureless sintering. Good high temperature strength is achieved by limiting the residual glassy phases present. Minimal electrical distortion occurs through reinforcement homogeneity. High thermal shock resistance is a result of the excellent thermal and mechanical properties. Improved impact resistance and fracture toughness is a result of the elongated fiber-like $Si_3N_4$ grains formed in the material.

The present invention provides for single piece, low cost ceramic radomes which are suitable for multiple systems that utilize millimeter wave radar guidance hardware. In addition to radome applications, other applications in which the present invention is useful are those which benefit from the unique combination of excellent electrical, thermal and mechanical properties useful to high operating temperatures, e.g., electrical packaging and stealth requirements. In combination with their high resistance to corrosion these materials are useful in marine applications, as well. Other applications which can capitalize on the high temperature mechanical properties and thermal shock resistance include fasteners and leading edges. Not only bulk composites, but likewise refractory ceramic fibers can be manufactured from this material.

Figure 1:
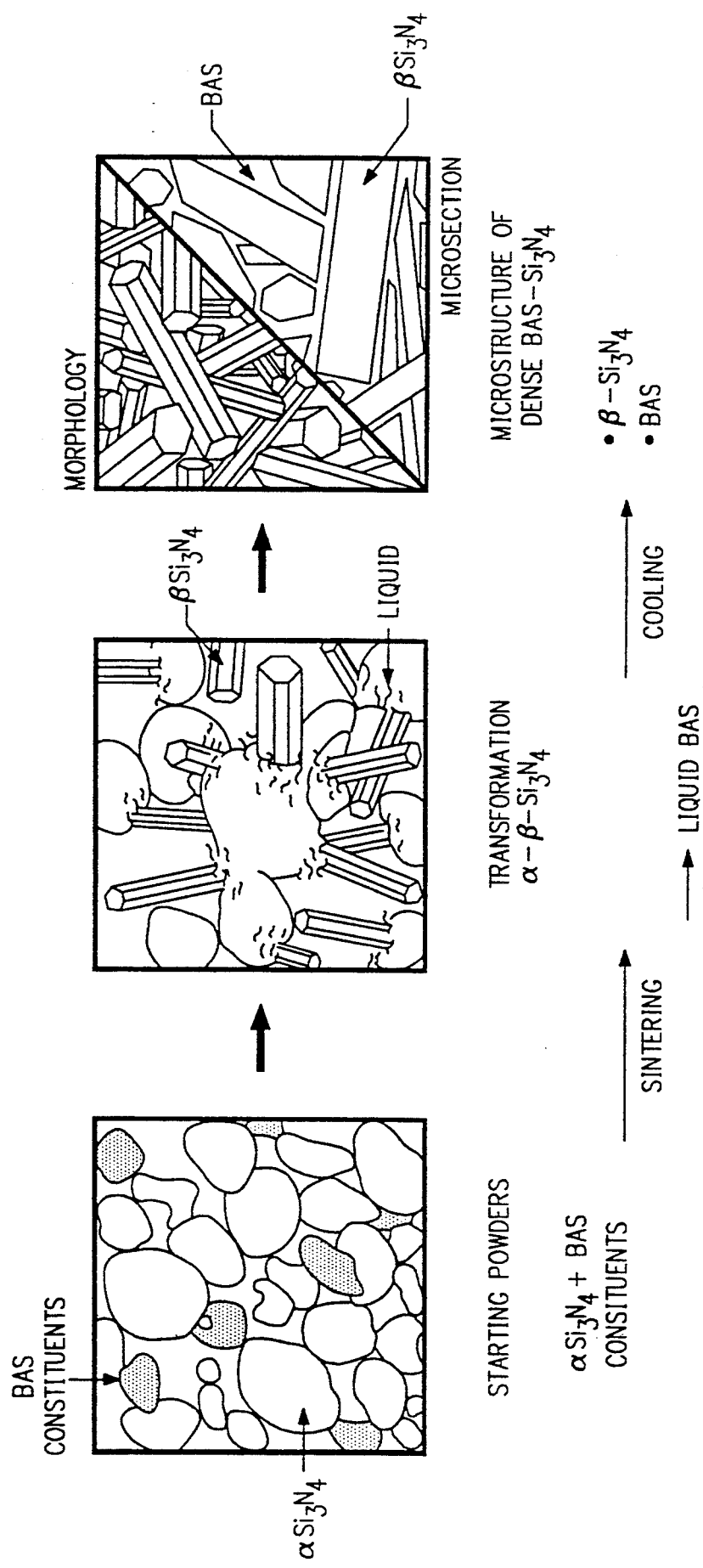
FIG. 1 is a flow chart demonstrating the process of developing BAS reinforced in-situ with silicon nitride.

A preformed shape is first made of high a-phase $Si_3N_4$ and the appropriate BAS forming additives. The material is then heated to a point where the additives and $Si_3N_4$ react to form a liquid phase. A transformation of the $Si_3N_4$ takes place in the presence of the liquid phase during which elongated $\beta$-phase $Si_3N_4$ grains are formed (liquid phase sintering). After cooling, the $\beta$-phase $Si_3N_4$ grains are surrounded by a second phase of crystalline BAS. The process is illustrated in FIG. 1. BAS forming starting materials used include barium carbonate ($BaCO_3$), aluminum oxide ($Al_2O_3$), and colloid silicon dioxide ($SiO_2$). Additional $SiO_2$ is provided by the oxidized silicon nitride ($Si_3N_4$). Ratios of $BaCO_3$, $Al_2O_3$ and $SiO_2$, as set forth below, were selected which provided stoichiometric BAS when reacted. Alternate sources of BAS forming materials can be used with selections available from a wide variety of salts and organometallics. BAS can also be used directly.

The source of the $Si_3N_4$ is $Si_3N_4$ powder. To achieve in-situ reinforcement by growth of elongated fiber-like grains of $\beta$-phase $Si_3N_4$, the $Si_3N_4$ powder should contain a high percentage of $\alpha$-phase $Si_3N_4$. In-situ reinforcement of BAS was successfully demonstrated with two different sources of $Si_3N_4$ (Hermann C. Stark, Inc. and UBE Industries America, Inc.). Other sources of $Si_3N_4$ powder are available and should work equally well pending compensation for the $SiO_2$ provided by the $Si_3N_4$.

During selection of the starting materials, purity must be considered. Low purity raw materials can be used to reduce manufacturing costs but only where a reduction in electrical properties and elevated temperature mechanical properties can be tolerated. For those applications where the ultimate in properties are required, high purity starting materials are required.

EXAMPLES

BAS: $Si_3N_4$ ratios examined and their respective compositions (m %) are shown below:

| BAS:$Si_3N_4$ RATIO (Vol. %) | $Si_3N_4$ (m %) | $BaCO_3$ (m %) | $Al_2O_3$ (m %) | $SiO_2$ (m %) |
| --- | --- | --- | --- | --- |
| 30:70 | 59.28 | 10.18 | 10.18 | 20.36 |
| 25:75 | 65.18 | 8.10 | 8.10 | 17.42 |
| 20:80 | 71.57 | 7.11 | 7.11 | 14.21 |
| 15:85 | 78.05 | 5.49 | 5.49 | 10.97 |

For each of the respective compositions, starting materials were first wet blended to insure a homogeneous mixture. Materials were blended in ethanol using a high density polyethylene jar with $Si_3N_4$ milling media for up to 12 hours. The starting materials could be blended in aqueous or nonaqueous solvents in various milling media, however, a $Si_3N_4$ milling media is preferred to control contamination. Blended materials were then rotary evaporated until dry, followed by oven drying at 110° C. overnight. The dried powder was granulated in a boron carbide mortar and pestle and sieved through a −325 mesh nylon screen in preparation for forming. The dry powders are formed into the desired shape by isostatic pressing the powders while contained in elastomeric molds with pressures up to 206.8 MPa. Different blending (e.g., drying blending) and forming methods, including slip casting, pressure casting, doctor blading and injection molding, can be used as required for the starting materials selected and manufacturing process desired. The only requirement is that the starting powders be well mixed and in reasonably intimate contact when formed.

Once formed into the desired shape, the powders are further densified by pressureless, liquid phase sintering. The liquid phase is comprised of the BAS forming additives. Because of the refractory nature of BAS (melting point of 1725° C.) the high temperatures necessary to densify the blended and formed powders cause thermal decomposition of the $Si_3N_4$ phase present. To suppress the decomposition of $Si_3N_4$ during densification by pressureless, liquid phase sintering, formed powders were first packed in a 50:50 wt. % mixture of boron nitride and silicon nitride (BN: $Si_3N_4$) contained in a graphite retort. This method and variations of it (different powder mixtures and packing methods) have been shown to suppress the decomposition of $Si_3N_4$ during pressureless sintering at temperatures greater than 1600° C.

While packed in a retort, the formed powders were heated at a rate of 20° C./min. in one atmosphere nitrogen to a temperature in the range of 1750°°C.–1900° C. and the temperature held constant for a period of 60 or 240 minutes to allow the densification process to occur. In the alternative, the dry powders may be simultaneously formed and sintered using glass forming techniques. After the "soak period" the now densified powders were cooled to room temperature at a rate of 1° C./min. or 5° C./min. These sintering conditions were applied to formed powders having BAS:$Si_3N_4$ ratios of 15:85, 20:80, 25:75 and 30:70. The sintering conditions and BAS:$Si_3N_4$ ratios were varied to examine their effect on the density, microstructure and crystallinity.

The preferred composition is a BAS:$Si_3N_4$ ratio of 30:70 sintered in one atmosphere nitrogen at 1850° C. for 60 minutes with a heating rate of 20° C./min. and a cooling rate of 1° C./min. The resulting density is greater than 95% of theoretical, has highly elongated fiber-like grains $\beta$-phase $Si_3N_4$ with the BAS present as a mixture of monoclinic and hexagonal phases.

The quantity of silicon nitride in the present invention may be as high as 90 vol. % and as low as 50 vol. %, whereas the quantity of barium aluminosilicate in the present invention may be as high as 50 vol. % and as low as 10 vol. %. An estimate of the fracture toughness, flexure strength, dielectric constant and coefficient of thermal expansion, at the upper and lower limits of barium aluminosilicate and silicon nitride, are illustrated below:

| BAS/$Si_3N_4$ Volume Percent | Fracture Toughness (MPa $\sqrt{m}$) @ 21° C. | Flexure Strength (MPa) @ 21° C. | Dielectric Constant at 35 GHz @ 21° C. | Coefficient of Thermal Expansion (ppm/°C.) |
|---|---|---|---|---|
| 10/90 | 12 | 620 | 8.0 | 3 |
| 50/50 | 2 | 345 | 7.0 | 5 |
| 30/70 | 4.8 | 519 | 7.3 | 3.96 |

The preferred embodiment of the present invention is a 30 vol. % BAS-70 vol. % $Si_3N_4$ powder composition prepared from 10.18 m % barium carbonate ($BaCO_3$), 10.18 m % aluminum oxide ($Al_2O_3$), 20.36 m % silicon dioxide ($SiO_2$) and 59.28 m % $Si_3N_4$ following preferred preparation guidelines as discussed above. Test billets were prepared by first compacting blended and dried powders by cold isostatic pressing at 206.8 MPa. These green stage billets were lightly machined with fine grit silicon carbide paper to remove surface flaws. Billets were packed in a powder bed of BN:$Si_3N_4$ and pressureless sintered under 1 atm nitrogen following the preferred sintering conditions discussed above resulting in BAS reinforced in-situ with elongated fiber-like grains of $\beta$-phase $Si_3N_4$.

Following pressureless sintering, bulk density was measured using Archimedes immersion technique. The sintered billets were ultimately machined into test coupons for measurement of the flexure strength, fracture toughness, dynamic modulus, microhardness, thermal expansion, dielectric constant, and loss tangent.

Flexure tests were performed between room temperature and 1471° C. according to MIL STD 1942A using a specimen size of 3 mm×4 mm×50 mm. A four point bend test fixture machined from silicon carbide was used to permit testing in air at elevated temperatures. Fracture toughness ($K_{IC}$) measurements were made using either the indentation direct cracked measurement (DCM) technique or the single edge notched beam (SENB) method. Fracture toughness measurements were limited to room temperature. Determination of $K_{IC}$ by the DCM method used averaged crack lengths (determined from Scanning Electron Microscope (SEM) micrographs) induced by a Vickers hardness indentor with an applied load of 10 kgf.

Elevated temperature tests were done in air using a heating rate of 30° C./min. Test bars were allowed to come to an equilibrium state at the desired temperature for a period of 15 minutes prior to testing. Three test specimens were broken at each temperature to obtain average values of flexure strength and fracture toughness. Microstructural analysis of select fracture surfaces was made using SEM.

Dynamic modulus was determined by nondestructive evaluation. A longitudinal soundwave was applied to the test cylinders and the velocity of the soundwave through the specimen measured. The modulus was calculated based on the work of Bhardwa (Bhardwa, "Principles and Methods of Ultrasonic Characterization of Materials", *Adv. Cer. Mat.*, 1[4], 311–324, (1986)). A Poisson's ratio of 0.25 was assumed for dynamic modulus calculations based on a Poisson's ratio for that of dense $Si_3N_4$.

Microhardness tests were performed on residual in-situ reinforced BAS flexure bars according to ASTM E384-84 using a Vickers hardness indentor with an applied load of 10 kgf. An average hardness was determined from ten indentation tests.

Thermal expansion measurements were performed in an argon atmosphere from room temperature to 1371° C. using ASTM E228-85 as a guideline. Thermal expansion data was collected at 55.6° C. intervals during the heating and cooling cycles. Heating and cooling rates were 6.9° C./min. Electrical properties (dielectric constant, loss tangent) were determined as a function of temperature at 35 GHz by measuring the transmission and reflection coefficient at a given angle of incidence for a plane parallel disk shaped sample placed between the transmitting and receiving horns.

Thermal shock testing was performed on sub-scale radomes fabricated in the same manner as the test coupons. Testing was performed by rapidly heating or cooling the radome to temperatures of 1150° C. and observing for surface cracks.

The bulk densities of the sintered in-situ reinforced BAS billets are shown in Table 1 below:

TABLE 1

| Billet | Density (g/cc) | % of Theoretical |
|---|---|---|
| 1 | 3.15 | 97.0 |
| 2 | 3.17 | 97.6 |
| 3 | 3.17 | 97.6 |
| 4 | 3.16 | 97.2 |
| 5 | 3.15 | 97.1 |
| 6 | 3.16 | 97.3 |
| 7 | 3.17 | 97.4 |

The densities of the samples were greater than or equal to 97.0% of approximated theoretical density (3.25 g/cc) based on a composition of 30 vol. % monoclinic BAS and 70 vol. % of $\beta$-$Si_3N_4$. A conventionally prepared whisker/platelet reinforced ceramic composite fabricated with a comparable volume percent of reinforcement (70 vol. %) can only achieve a density of less than 70% of theoretical when pressureless sintered.

High densities for conventionally prepared pressureless sintered reinforced ceramic composites can only be achieved with less than 20 vol. % reinforcement. The mechanical properties have been shown to increase with increasing reinforcement concentration. The present invention with the 70 vol. % reinforcement achieves a density of at least 97% of theoretical.

The room temperature mechanical properties for in-situ reinforced BAS are summarized in Table 2 below and compared to materials which would be considered for the same applications as the present invention.

TABLE 2

Room Temperature Mechanical Properties of BAS & $Si_3N_4$ Materials

| COMPOSITION | DENSITY (% of Theo.) | FLEXURE STRENGTH MPa | FRACTURE* TOUGHNESS MPa·$\sqrt{m}$ |
|---|---|---|---|
| In-Situ Reinforced BAS | 97.0 | 519 | 4.82 |
| Monoclinic BAS | 92.7 | 78 | 1.8 |
| Hexagonal BAS | 98.5 | 130 | — |
| Hot Pressed $Si_3N_4$ | 99.9 | 523 | 6.0 |

*by the SENB method

The flexure strength of in-situ reinforced BAS is 4.0 and 6.6 times greater than that of hexagonal and monoclinic BAS, respectively and comparable to that of hot pressed $Si_3N_4$. The fracture toughness of in-situ reinforced BAS is 2.68 times that of monoclinic BAS and 0.80 times that of hot pressed $Si_3N_4$. These data illustrate a significant improvement in the mechanical properties of BAS when in-situ reinforced. Even though currently slightly inferior to hot pressed $Si_3N_4$, the electrical properties of in-situ reinforced BAS are far superior to that of hot pressed $Si_3N_4$, as discussed below. Further, improvements in the mechanical properties of in-situ reinforced BAS (fracture toughness as high as 12 MPa$\sqrt{m}$) are believed possible with processing refinements. Room temperature toughness values as determined by the DCM method are somewhat higher than those measured by the SENB method, 6.80 MPa$\sqrt{m}$ versus 4.82 MPa/m, respectively. The difference in the $K_{IC}$ values between the SENB and DCM methods are assumed to be a result of compressive stresses formed in the microstructure of residual glass phases. These compressive stresses tend to offset the stress induced by the indentation process of the DCM method. The net result being a reduced crack length which translates to an apparent increase of fracture toughness. Since the mode of failure by the DCM indentation method is similar to the mode of failure expected during rain erosion of radomes, excellent performance under these conditions is expected.

Figure 2:
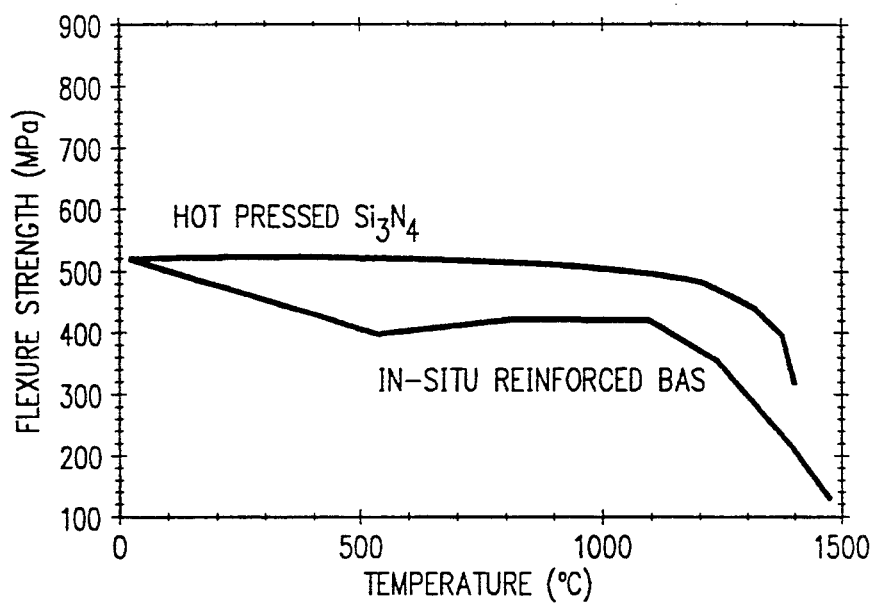
FIG. 2 is a graph comparing the flexure strength of BAS reinforced in-situ with silicon nitride to hot pressed $Si_3N_4$.

The flexure strength of in-situ reinforced BAS at elevated temperatures is shown in FIG. 2 and compared to that of hot pressed $Si_3N_4$. Similar data for BAS is not available. These data show that in-situ reinforced BAS retains a useful strength (greater than 150 MPa) at temperatures up to 1400° C. Even though hot pressured $Si_3N_4$ exhibits a flexure strength 10-20% higher than that of in-situ reinforced BAS, the electrical properties of in-situ reinforced BAS are far superior to that of hot pressured $Si_3N_4$, as discussed below. Further, refinements of in-situ reinforced BAS are expected to make the elevated temperature strength comparable to that of hot pressed $Si_3N_4$. Ultimately the strength of in-situ reinforced BAS at temperatures greater than 1200° C. should exceed that of hot pressed $Si_3N_4$.

Room temperature dynamic modulus measured by ultrasonic techniques was 226 GPa. The dynamic modulus of hot pressed $Si_3N_4$ is 290-307 GPa. Microhardness of in-situ reinforced BAS measured by Vickers indentation yielded an average hardness of 1271 kg/mm² using a 10 kfg load. For comparison, hot pressed $Si_3N_4$ is reported to have a microhardness of 1700-2200 kg/mm².

Figure 3:
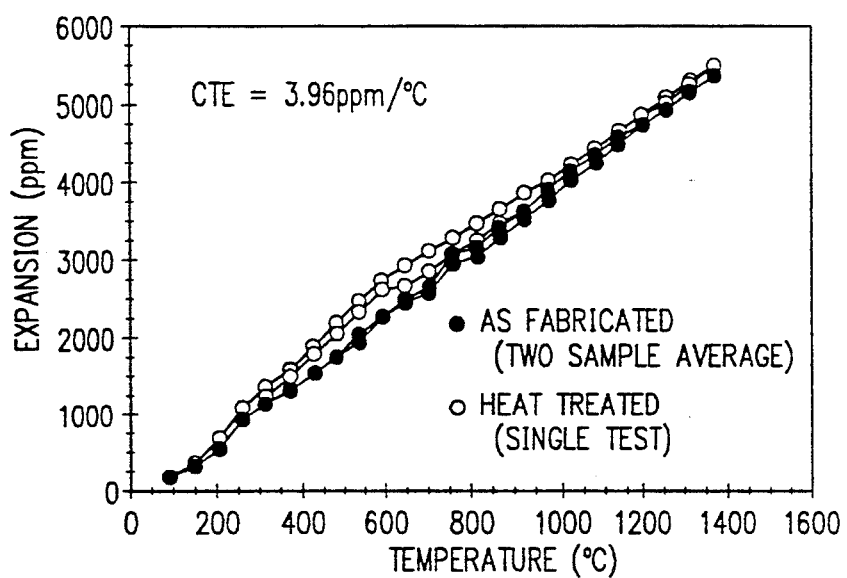
FIG. 3 is a graph demonstrating the coefficient of thermal expansion of BAS reinforced in-situ with silicon nitride.

Thermal expansion data of in-situ reinforced BAS between room temperature and 1371° C. is shown in FIG. 3. Data show that the in-situ reinforced BAS has a low thermal expansion of 4.0 ppm/° C. Thermal expansion has a relatively linear temperature dependence over the measured temperature range with a minor anomaly in expansion detectable at 260° C. This is believed to be related to the orthorhombic to hexagonic phase transformation reported for hexagonal BAS at 300° C. This transformation is normally accompanied by a destructive change in volume which was not seen in the samples of in-situ reinforced BAS tested. Suppression of catastrophic failure during transformation is presumed to be the result of the in-situ reinforcing phase. Coefficient of thermal expansion (CTE) data for in-situ reinforced BAS, monoclinic BAS and hexagonal BAS and hot pressed $Si_3N_4$ is summarized in Table 3, below:

TABLE 3

Coefficient of Thermal Expansion for In-Situ Reinforced BAS, BAS, and $Si_3N_4$

| MATERIAL | CTE ppm/°C. |
|---|---|
| In-Situ Reinforced BAS | 3.96 |
| Celsian BAS | 2.29 |
| Hexacelsian BAS | 7.99 |
| $Si_3N_4$ | 3.31 |

In-situ reinforced BAS is seen to have a CTE which falls between monoclinic and hexagonal BAS but greater than that of $Si_3N_4$. Preliminary analysis of the crystallographic phases present showed in-situ reinforced BAS to be composed of β-phase $Si_3N_4$, α-phase $Si_3N_4$ and BAS. Based on a rule of mixtures calculation of CTE for the composition of 70% $Si_3N_4$:30% BAS, the BAS phases present are 17% hexagonal and 13% monoclinic.

The significance of the overall low value of CTE measured for in-situ reinforced BAS is excellent thermal shock resistance, reduced electrical distortion when used in a radome, and low mismatch with silicon for use in microelectronic packaging. For the latter application, the ability to engineer the thermal expansion through changes in the BAS:$Si_3N_4$ ratio provides opportunities for a very low mismatch.

Figure 4:
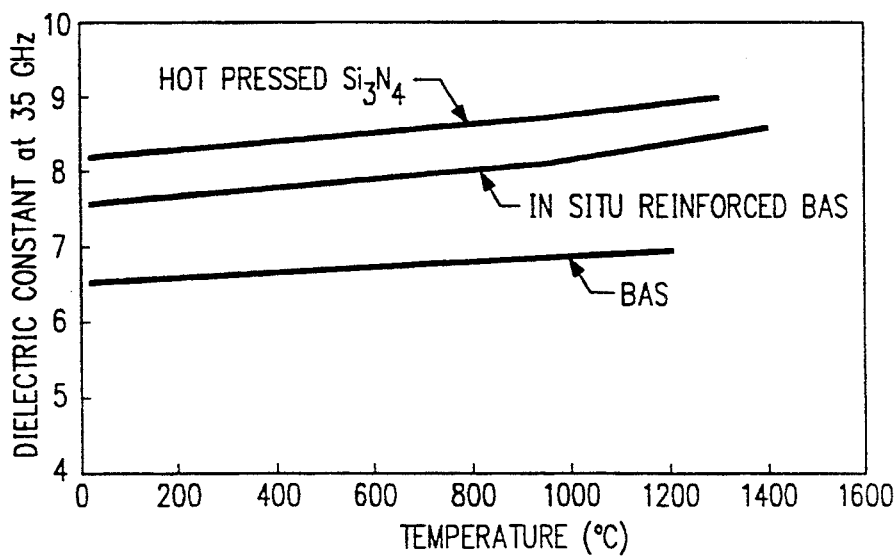
FIG. 4 is a graph comparing the dielectric constant of BAS reinforced in-situ with silicon nitride to hot pressed $Si_3N_4$ and monoclinic BAS.

The dielectric constant of in-situ reinforced BAS as a function of temperature is shown in FIG. 4. The dielectric constant at room temperature was 7.3 and increased linearly to 8.6 at 1400° C. both at 35 GHz These measurements are compared to values reported for monoclinic BAS and hot pressed $Si_3N_4$. As expected, the values for in-situ reinforced BAS fall between those of monoclinic BAS and hot pressed $Si_3N_4$. By varying the ratio of BAS:$Si_3N_4$, in-situ reinforced BAS can be manufactured to behave electrically more like hot pressed $Si_3N_4$ or monoclinic BAS. The crystallinity of BAS present will also impact the electrical performance.

Monoclinic BAS is reported the preferred phase of BAS because of its lower change in dielectric constant with temperature. The current in-situ reinforced BAS contains primarily hexagonal BAS. By modifying the sintering conditions or adding crystalline phase modifiers, a predominance of monoclinic BAS should be achievable. Preliminary data confirms that increasing amounts of monoclinic BAS can be achieved by including a post-sintering heat treatment in the overall processing cycle. The significance of these data apply when in-situ reinforced BAS is being considered for use in radomes or electronic packaging. Performance of both is dependent upon a low dielectric constant, the lower the better.

The loss tangent measured at room temperature only was 0.0003. This is significantly lower than that reported for hot-pressed $Si_3N_4$ (>0.002) and comparable to that of monoclinic BAS. The low loss tangent of in-situ reinforced BAS is of significance for those applications where radar transmission is required (radomes). The lower the loss tangent, the less power is required of the transmitter which in turn reduces the payload.

Sub-scale radomes fabricated from in-situ reinforced BAS were repeatedly cycled over a temperature range of 21° C.–1150° C.–21° C. in rapid succession. The tolerance of the material to this thermal shock condition was found to be excellent and demonstrates its suitability to a number of hot structure applications.

In summary, in-situ reinforced BAS is an attractive candidate for applications requiring a combination of high strength, high fracture toughness, low dielectric constant, low lost tangent, high thermal shock resistance, low thermal expansion, high hardness, light weight, high thermal stability and low cost. A partial list of applications requiring one or more of the properties include: radomes, microelectronic packaging, leading edges, fasteners, and continuous fiber reinforcements.

What is claimed is:

1. A composition of matter, comprising:
   (a) between about 50–90 volume % of $Si_3N_4$ of which 30–100 volume % is $\beta$-$Si_3N_4$ elongated fiber-like grains and the remainder is $\alpha$-$Si_3N_4$; and
   (b) between about 10–50 volume % of barium aluminosilicate,
   wherein said composition is an in-situ reinforced ceramic composite.

2. A composition as in claim 1, wherein the barium aluminosilicate is primarily in the hexagonal crystalline form of said barium aluminosilicate.

3. A composition as in claim 1, wherein the barium aluminosilicate is primarily in the monoclinic crystalline form of said barium aluminosilicate.

4. A composition as in claim 1, whereby said in-situ reinforced ceramic composite has a room temperature flexure strength in the range of 345–620 MPa.

5. A composition as in claim 1, whereby said in-situ reinforced ceramic composite has a fracture toughness at 21° C. in the range of 2–12 MPa./m.

6. A composition as in claim 1, whereby said in-situ reinforced ceramic composite has a room temperature dielectric constant in the range of 7.0 to 8.0 at 35 GHz.

7. A process for the manufacture of a composition of matter of claim 1, comprising:
   (a) in-situ reinforcing said composition by blending between about 50–90 volume % $\alpha$-phase silicon nitride powder and 10–50 volume % barium aluminosilicate forming powders, creating a homogeneous mixture;
   (b) forming said homogeneous mixture into a formed powder mixture in a manner that produces intimate contact of its constituents;
   (c) sintering said formed powder mixture at a temperature between about 1750°–1900° C. in a nitrogen atmosphere;
   (d) cooling said formed powder mixture to room temperature.

8. A process according to claim 7, wherein said formed powder mixture is sintered without pressure to form an in-situ reinforced composite.

9. In-situ reinforced glass ceramic composite manufactured in accordance with claim 7.

10. A composition of matter, comprising:
    (a) between about 50–90 volume % of $Si_3N_4$ of which 30–100% is $\beta$-$Si_3N_4$ elongated fiber-like grains and the remainder is $\alpha$-$Si_3N_4$; and
    (b) between about 10–50 volume % of a sintering aid, wherein said composition is an in-situ reinforced ceramic composite.

11. A composition as in claim 10, wherein said sintering aid is primarily in the hexagonal crystalline form of said sintering aid.

12. A composition as in claim 10, wherein said sintering aid is primarily in the monoclinic crystalline form of said sintering aid.

13. A process for the manufacture of a composition of matter of claim 1, comprising:
    (a) in-situ reinforcing said composition by blending between about 50–90 volume % $\alpha$-phase silicon nitride powder and 10–50 volume % of a sintering aid forming powders, creating a homogeneous mixture;
    (b) forming said homogeneous mixture into a formed powder mixture in a manner that produces intimate contact of its constituents;
    (c) sintering said formed powder mixture at a temperature between about 1750°–1900° C. in a nitrogen atmosphere;
    (d) cooling said formed powder mixture to room temperature.

14. A process according to claim 13, wherein said formed powder mixture is sintered without pressure to form an in-situ reinforced ceramic composite.

15. In-situ reinforced glass ceramic composite manufactured in accordance with claim 13.

* * * * *

UNITED STATES PATENT AND TRADEMARK OFFICE
CERTIFICATE OF CORRECTION

PATENT NO. : 5,358,912

DATED : October 25, 1994

INVENTOR(S) : Douglas W. Freitag et al

It is certified that error appears in the above-indentified patent and that said Letters Patent is hereby corrected as shown below:

Column 10, line 3, change "MPa./m." to --MPa√m.--.

Signed and Sealed this

Third Day of January, 1995

BRUCE LEHMAN

*Attest:*

*Attesting Officer*  *Commissioner of Patents and Trademarks*